United States Patent
Doughty et al.

(10) Patent No.: US 10,095,485 B2
(45) Date of Patent: Oct. 9, 2018

(54) ANALYZING OBJECTS FROM A GRAPHICAL INTERFACE FOR STANDARDS VERIFICATION

(75) Inventors: Chris L. Doughty, Austin, TX (US); Bryant G. Luk, Round Rock, TX (US); Brian P. Preston, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 965 days.

(21) Appl. No.: 12/648,372

(22) Filed: Dec. 29, 2009

(65) Prior Publication Data

US 2011/0161874 A1 Jun. 30, 2011

(51) Int. Cl.
*G06F 8/33* (2018.01)

(52) U.S. Cl.
CPC ...................... *G06F 8/33* (2013.01)

(58) Field of Classification Search
CPC .............................. G06F 3/04847; G06F 8/33
USPC ............................................ 715/763; 714/25
See application file for complete search history.

(56) References Cited

U.S. PATENT DOCUMENTS

| | | | |
|---|---|---|---|
| 5,600,789 A | 2/1997 | Parker et al. | |
| 5,974,254 A * | 10/1999 | Hsu | 717/109 |
| 6,046,740 A | 4/2000 | LaRoche et al. | |
| 6,223,185 B1 * | 4/2001 | Berkland et al. | |
| 6,429,885 B1 | 8/2002 | Saib et al. | |
| 6,804,684 B2 * | 10/2004 | Stubler | G06F 17/30256 |
| 6,865,580 B1 * | 3/2005 | Bush | 717/116 |
| 6,891,552 B1 * | 5/2005 | Bush | 715/762 |
| 7,236,973 B2 * | 6/2007 | Kalthoff et al. | 707/650 |
| 7,325,160 B2 * | 1/2008 | Tsao | 714/15 |
| 7,353,510 B2 * | 4/2008 | Noirot-Nerin | 717/175 |
| 8,266,585 B2 | 9/2012 | Funto et al. | |
| 8,677,272 B2 | 3/2014 | Lance | |

(Continued)

FOREIGN PATENT DOCUMENTS

| | | |
|---|---|---|
| CN | 1983173 A | 6/2007 |
| CN | 102725729 A | 10/2012 |

(Continued)

OTHER PUBLICATIONS

WIPO Appln. No. PCT/EP2010/069563, International Search Report and Written Opinion, dated Apr. 20, 2011, 9 pg.

(Continued)

*Primary Examiner* — Alvin Tan
(74) *Attorney, Agent, or Firm* — Cuenot, Forsythe & Kim, LLC

(57) ABSTRACT

A method of analyzing graphical user interface (GUI) objects. The method can include dynamically scanning attributes assigned to various GUI objects assigned to a view of a GUI in order to identify attributes associated with each of the GUI objects. For each of the GUI objects, a list of attributes can be generated. A determination can be made as to whether at least one of the GUI objects has a list of attributes that does not correspond to lists of attributes for other GUI objects. When at least one GUI object has a list of attributes that does not correspond to lists of attributes for other GUI objects, an identifier can be output. The identifier can indicate that the GUI object has the list of attributes that does not correspond to the lists of attributes for the other GUI objects.

12 Claims, 3 Drawing Sheets

(56) References Cited

U.S. PATENT DOCUMENTS

2004/0001092 A1    1/2004  Rothwein et al.
2004/0267789 A1*  12/2004  Miyake ................ H04L 41/082
2007/0136691 A1    6/2007  Lance
2008/0320438 A1   12/2008  Funto et al.
2012/0124495 A1*   5/2012  Amichai et al. ............. 715/762

FOREIGN PATENT DOCUMENTS

| DE | 112010003948 18 | 12/2012 |
| GB | 2488651 A | 9/2012 |
| WO | 2007068527 A1 | 6/2007 |
| WO | 2011080062 A1 | 7/2011 |

OTHER PUBLICATIONS

UK Appln. No. GB1203474.0, Examination Report Under Section 18(3), dated Nov. 26, 2015, 5 pg.

* cited by examiner

300

Dynamically scan attributes assigned to various graphical user interface objects assigned to a view of a graphical user interface in order to identify attributes associated with each of the graphical user interface objects
302

For each of the graphical user interface objects generate a list of attributes
304

Determine whether at least one of the graphical user interface objects has a list of attributes that does not correspond to lists of attributes for other graphical user interface objects
306

When at least one of the graphical user interface objects has a list of attributes that does not correspond to lists of attributes for other graphical user interface objects, output an identifier that indicates that the at least one of the graphical user interface objects has the list of attributes that does not correspond to the lists of attributes for the other graphical user interface objects
308

FIG. 3

ANALYZING OBJECTS FROM A GRAPHICAL INTERFACE FOR STANDARDS VERIFICATION

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The embodiments disclosed within this specification relate to user interfaces. More particularly, the embodiments relate to graphical user interface objects.

Graphical user interface objects (hereinafter "objects") are routinely incorporated into graphical user interfaces (GUIs). Such GUIs sometimes become quite complex, requiring a myriad of different objects. Presently, computer programmers who program such GUIs must keep track of the various attributes assigned to different objects that are incorporated into the GUIs so as to ensure that there are no conflicts among the various objects. Managing the various objects and their attributes can be cumbersome, however.

BRIEF SUMMARY OF THE INVENTION

The embodiments disclosed within this specification relate to user interfaces. More particularly, the embodiments relate to graphical user interface (GUI) objects. One embodiment of the present invention can include a method of analyzing GUI objects. The method can include dynamically scanning attributes assigned to various GUI objects that are assigned to a view of a GUI in order to identify attributes associated with each of the GUI objects. For each of the GUI objects, a list of attributes can be generated. A determination can be made as to whether at least one of the GUI objects has a list of attributes that does not correspond to lists of attributes for other GUI objects. When at least one GUI object has a list of attributes that does not correspond to lists of attributes for other GUI objects, an identifier can be output. The identifier can indicate that the GUI object has the list of attributes that does not correspond to the lists of attributes for the other GUI objects.

Another embodiment of the present invention can include a method of analyzing GUI objects. The method can include dynamically scanning attributes assigned to various ones of the GUI objects that are assigned to a view of a GUI in order to identify attributes associated with each of the GUI objects. For each of the GUI objects, a list of attributes can be generated. Based on the attributes associated with each of the graphical user interface objects, an attribute rule set can be generated. A determination can be made as to whether at least one of the GUI objects has a list of attributes that does not correspond to the attribute rule set. When at least one GUI object has a list of attributes that does not correspond to the attribute rule set, an identifier can be output. The identifier can indicate that the GUI object has the list of attributes that does not correspond to the attribute rule set.

Yet another embodiment of the present invention can include a computer program product including a computer-usable medium having computer-usable program code that, when executed, causes a machine to perform the various steps and/or functions described herein.

BRIEF DESCRIPTION OF THE SEVERAL VIEWS OF THE DRAWINGS

FIG. 3 is a flow chart illustrating a method of analyzing objects from a graphical user interface in accordance with another embodiment of the present invention.

DETAILED DESCRIPTION OF THE INVENTION

Figure 1:
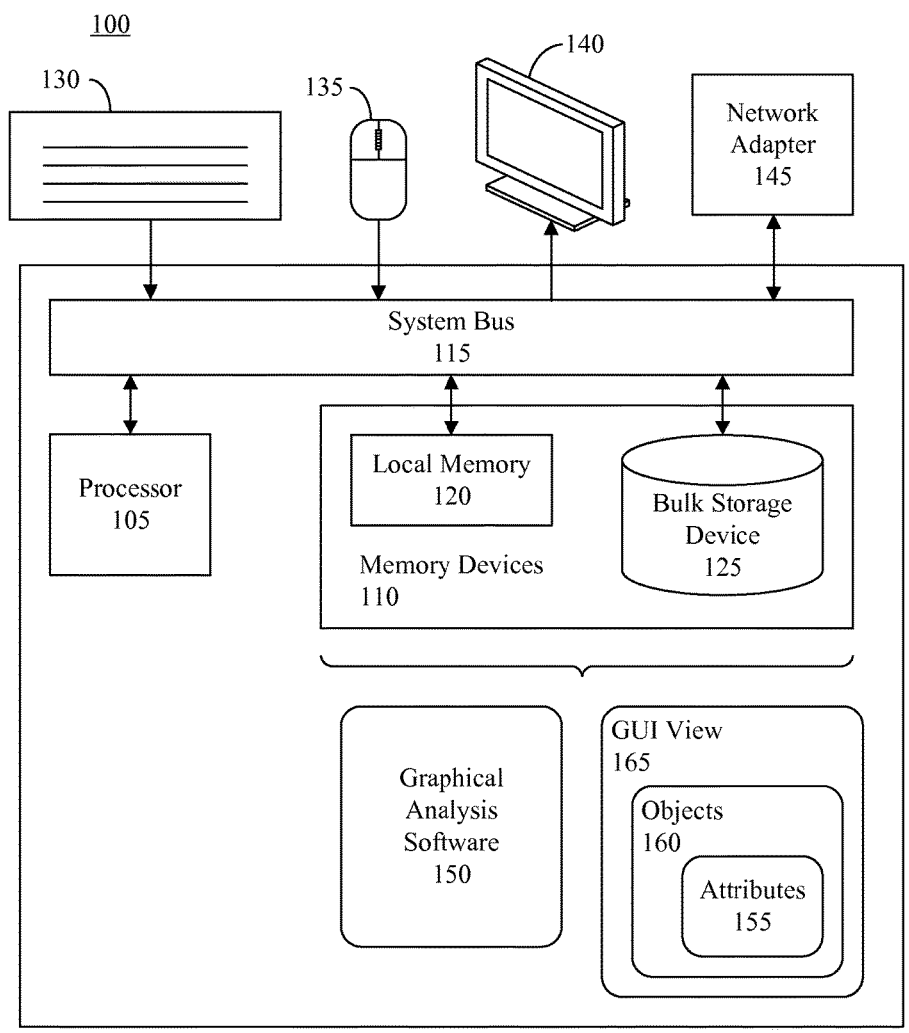
FIG. 1 is a block diagram illustrating a system for analyzing graphical user interface objects in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The embodiments disclosed herein relate to dynamically scanning attributes assigned to various graphical user interface objects which are presented in a view of a graphical user interface (hereinafter "objects"). The objects that are scanned can be all objects in a particular view, or objects that are selected by a user. The attributes that are assigned to various objects can be dynamically identified. For each of the objects, a list of attributes can be generated. When the list of attributes for a particular object does not correspond to attributes for lists of objects generated for other objects, one or more identifiers can be output to indicate such circumstance.

In illustration, the lists for each object can be compared to determine attributes that are present in a particular portion of the lists that are generated. Such portion can be user determined or can be a default value, and the attributes present in that portion of the objects can be identified as reference attributes. If a particular object has attributes that do not correspond to the reference attributes, the identifier that is output for the object can indicate that such attributes do not correspond to the reference attributes. If, however, a particular object lacks attributes contained in the reference attributes, the identifier that is output for the object can indicate the attributes contained in the reference attributes that are lacking for the object.

Moreover, the attributes for each object can be compared to one or more standard attributes that may be applicable to the view. The identifier that is output can indicate attributes that are associated with the object that do not correspond to the standard attributes, and/or indicate one or more standard attributes that are not presently associated with the object. The standard attributes can be attributes defined by a desired standard or protocol applicable to the type of view in which the objects are presented.

FIG. 1 is a block diagram illustrating a processing system 100 for analyzing objects of a graphical user interface (GUI) in accordance with one embodiment of the present invention. The system 100 can include at least one processor 105 coupled to memory devices 110 through a system bus 115. As such, the system 100 can store program code within the memory devices 110. The processor 105 can execute the program code accessed from the memory devices 110 via the system bus 115. In one aspect, for example, the system 100 can be implemented as computer that is suitable for storing and/or executing program code. It should be appreciated, however, that the system 100 can be implemented in the form of any system comprising a processor and memory that is capable of performing the functions described within this specification.

The memory devices 110 can include one or more physical memory devices such as, for example, local memory 120 and one or more bulk storage devices 125. Local memory 120 refers to random access memory or other non-persistent memory device(s) generally used during actual execution of the program code. The bulk storage device(s) 125 can be implemented as a hard drive or other persistent data storage device. The system 100 also can include one or more cache memories (not shown) that provide temporary storage of at least some program code in order to reduce the number of times program code must be retrieved from the bulk storage device 125 during execution.

Input/output (I/O) devices such as keyboard 130, a pointing device 135, and a display 140 also can be coupled to the system 100. The I/O devices can be coupled to the system 100 either directly or through intervening I/O controllers. A network adapter 145 also can be coupled to the system 100 to enable the system 100 to communicate with other systems, computer systems, remote printers, and/or remote storage devices through intervening private or public networks. Modems, cable modems, Ethernet cards, and wireless network adapters, are examples of different types of network adapters that can be used with system 100.

As pictured in FIG. 1, the memory devices 110 can store graphical analysis software 150. The graphical analysis software 150, being implemented in the form of executable program code, can be executed by the system 100 for the purposes of scanning attributes 155 assigned to various objects 160 in a view 165 of a GUI, and identifying object attributes 155 that do not correspond to attributes for lists of objects generated for other objects in accordance with the methods described herein. Identifiers corresponding to the identified attributes can be output to the memory devices 110, the display 140, or output in any other suitable manner. As used herein, "outputting" and/or "output" can mean storing in memory devices 110, for example, writing to a file stored in memory devices 110, writing to the display 140 or other peripheral output device, playing audible notifications, sending or transmitting to another system, exporting, or the like.

In one embodiment, the graphical analysis software 150 of the present invention can be implemented in IBM® Rational® Functional Tester™ (IBM, Rational, and Rational Functional Tester are trademarks of International Business Machines Corporation in the United States, other countries, or both). The invention is not limited in this regard, however. Indeed, the graphical analysis software 150 can be implemented in a web development application, a software development application, or in any other application in which GUIs are designed and/or tested. For example, the present invention can be implemented as a plug-in, module, routine or sub-routine within an application.

In another embodiment, the graphical analysis software 150 can be implemented as a stand-alone application that interfaces with another application that presents a GUI. As noted, such other application can be an application in which GUIs are designed and/or tested, but this need not be the case. For example, the graphical analysis software 150 can interface with a conventional web browser.

Figure 2:
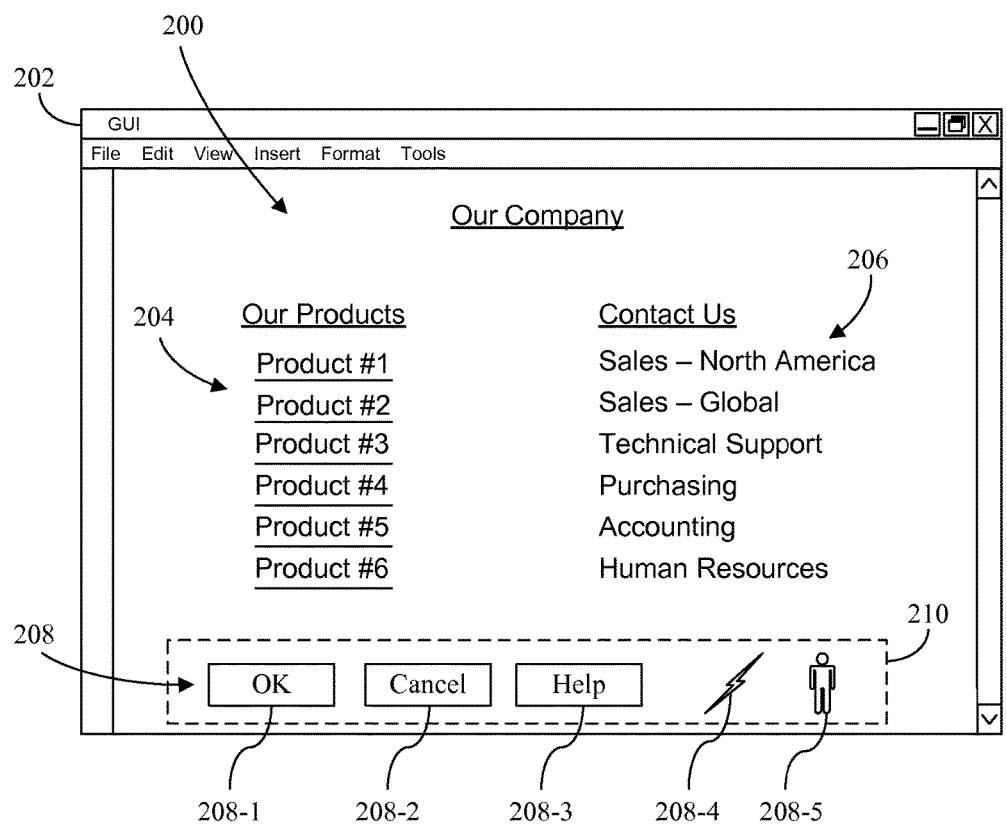
FIG. 2 is a view of a graphical user interface in accordance with another embodiment of the present invention.

FIG. 2 is a view 200 of GUI 202 in accordance with another embodiment of the present invention. As noted, the GUI 202 can be presented in a suitable application that includes the graphical analysis software or to which the graphical analysis software is communicatively linked.

Within the GUI 202, a plurality of GUI objects (hereinafter "objects") 204, 206, 208 that are assigned to the view 200 can be presented. The objects 204, 206, 208 can be icons, buttons, links, text fields, data input fields (e.g., boxes), images, portions of a view (e.g., header, footer, container, body, section, etc.) or any other objects that may be presented in a view of a GUI, or otherwise associated with a view of a GUI.

Each of the objects 204, 206, 208 can have one or more associated attributes. The attributes can identify classes to which the objects belong, define object types (e.g., hyperlink, button, icon, etc.), include links to other web pages, links to electronic mail (e-mail) addresses, define font styles (e.g., font type, font size, font color, font style, etc.), define object dimensions, define object color and/or background color, define object positions (e.g., horizontal position, vertical position, alignment, etc.), define object padding, identify images to be presented with the objects, define GUI layers on which the objects are placed, define functions, routines and/or sub-routines that are to be executed when the objects are selected or deselected, and so on. Still, any of a myriad of other attributes can be associated with each of the objects 204, 206, 208 and the invention is not limited in this regard.

The attributes can be associated with the objects in any suitable manner, for example using hypertext markup language (HTML), using cascading style sheets (CSS), or the like. A very simple example of HTML code that can be used to associate attributes with an object is presented in TABLE 1:

TABLE 1

<div class="products"><a href="product#1.html" title="Product #1" target="_top">Product #1</a><img src="images/line.gif" alt="space" /></div>

In this example, an object is assigned to a class "products," provides a hyperlink to a web page titled "product#1.html", assigns a title "Product #1" to the object, defines that the product#1.html window will be presented on top, defines text of "Product #1" for the object, and includes an image attribute to place a line below the object.

The graphical analysis software can dynamically scan the attributes assigned to the various objects 204, 206, 208 in order to identify the attributes that are associated with the objects 204, 206, 208. In illustration, the graphical analysis software can scan computer program code that defines the view 200 in order to identify the objects 204, 206, 208 and their respective attributes. Such computer program code can be HTML code, CSS code, or any other computer program code that may be used to define a view 200 in a GUI 202.

To identify the objects and their respective attributes, the scanning process can identify object tags corresponding to the objects 204, 206, 208, and identify attribute tags associated with each of the objects. The attribute tags can define the attributes for those objects 204, 206, 208.

Based on the identified objects 204, 206, 208 and their respective attributes, the graphical analysis software can generate a correlation model output comprising a list of attributes for each of the objects 204, 206, 208. Such lists can be generated in any suitable format. For example, the lists can be generated as an extensible markup language (XML) document, as a text file, as records in a data table or hash table, etc.

In the correlation model output, the objects 204, 206, 208 can be grouped separately with their corresponding attributes. In this regard, attributes for all of the objects 204, 206, 208 can be presented in a manner that associates the attributes with the objects 204, 206, 208. An example of a correlation model output that can be generated in this manner for an XML file is presented in TABLE 2.

TABLE 2

```
Output Design A Layout (Correlation)

<specificWidget type="">
            <property name="" value="" />
        </specificWidget>

Output Design A Example

<widget type="button">
        <property name="id" value= "button1" />
        <property name="label" value="OK" />
        <property name="enabled" value="true" />      1 of 3 of buttons have
an "enabled" property
    </widget>
```

TABLE 2-continued

```
    <widget type="button">
        <property name="id" value="button2" />
        <property name="label" value="Cancel" />
        ENABLE PROPERTY MISSING
    </widget>
    <widget type="button">
        <property name="id" value="button3" />
        <property name="label" value="Help" />
        ENABLE PROPERTY MISSING
    </widget>
    <widget type="img">
        <property name="src" value="image src1" />
        <property name="altText" value="image alt text1" />    2 of 3 images have an
"altText" property
    </widget>
    <widget type="img">
        <property name="src" value="image src2" />
        <property name="altText" value="image alt text2" />
    </widget>
    <widget type="img">
        <property name="src" value="image src3" />
        ALTTEXT PROPERTY MISSING
    </widget>

```

For the correlation model output depicted in TABLE 2, the attributes for each of the identified objects 204, 206, 208 can be grouped and designated to the respective objects 204, 206, 208. Processing of this data then can be implemented so that the attributes for each of the objects 204, 206, 208 are compared to attributes for similar objects 204, 206, 208. For example, referring to FIG. 2, attributes for the object 208-1 can be compared to attributes of the other objects 208-2, 208-3, 208-4, 208-5, attributes for the object 208-2 can be compared to attributes of the other objects 208-1, 208-3, 208-4, 208-5, and so on. Any deviation in the attributes that are compared can be identified and output in a suitable manner (e.g., output to memory devices, a file, a display, etc.).

In this example, the "OK" button 208-1 includes an "enable" attribute, whereas the "Cancel" button 208-2 and the "Help" button 208-3 do not. Further, the image 208-4 includes an "altText" attribute while the image 208-5 does not. An output that is generated can indicate which of these objects 208 lack attributes present for other objects 208, and which of these objects include attributes that are not present for the other objects.

For example, referring again to TABLE 2, attributes not present for all of the objects can be identified, and where those attributes are missing from the object tags can be identified. Such attributes, and where they appear to be missing, can be identified in any suitable manner, for instance by presenting text with a particular font style (e.g., underlined, bold, italics, font color, background color, etc.). Additional identifiers (e.g., alphanumeric text, icons, or the like) also can be added to the output file to provide indications as to which attributes appear to be extra or missing from the objects, which attributes are associated with the majority of objects or a majority of a particular type of object, and so on. Moreover, attribute values that are not consistent among the objects also can be noted. For example, if one instance of an OK value is presented as "OK," and another instance is presented as "Ok," the differences in the font case can be identified in the output file.

In another arrangement, the objects 204, 206, 208 and their attributes can be presented in a manner that facilitates global property inspection and cross referencing. For example, the objects 204, 206, 208 and attributes can be output in a tree format and grouped by object types. In illustration, a group can be created for "buttons," a group can be created for "images," and so forth. Global identifiers also can be included in the output to indicate object types that are grouped together. The global property inspection and cross referencing can be used to detect abnormalities in the object attributes. For instance, if one button has a label "OK," while another button has a label "Ok," the abnormality of presenting "OK" in these different manners can be detected and displayed. An example of XML code presented in a tree formatted XML file is depicted in TABLE 3:

TABLE 3

```
Output Design B Layout (Tree)
<widgets>
    <genericWidgetType>
        <widget property>count</widget property>
    </genericWidgetType>
</widgets>
Output Design B Example
<widgets>
    <button>
        <value>
            <Ok>1</Ok>            Non-standard 'Ok' label for 'OK'
            <OK>2</OK>
        </value>
        <id>
            <button2>1</button2>
            <button2>2</button2>   Two buttons share the same ID
        </id>
    </button>
</widgets>
```

Again, for the example tree model output depicted in TABLE 3, identifiers can be presented to identify inconsistencies among the object attributes. An output generated in accordance with the example presented in TABLE 3 can facilitate visual inspection of the various attributes assigned to similar objects 204, 206, 208.

Regardless of the manner in which the objects 204, 206, 208 and their attributes are presented, the objects 204, 206, 208 that are analyzed to generate the attribute lists can include all objects 204, 206, 208 in the view 200, or a portion of the objects 204, 206, 208. In this regard, a user selection can be received to select various ones of the user interface objects 204, 206, 208 for analysis. For example, a user can use a pointing device to select the objects 208, for instance by placing a selection box 210 around the objects 208 in the view 200. In another arrangement, the user can select the objects by identifying the objects within the computer program code for the view 200, for example by selecting the objects from the computer program code in XML files, selecting the objects from another output file that is generated, or selecting the objects in another suitable manner.

In yet another arrangement, a user can configure a web browser or application in a rich text format (RFT), load a target view, and scan a configured interface in which the view is presented. Alternatively, a subset can be indicted by passing a coded section tag, such as an HTML <DIV> section, as noted.

In another embodiment, a standards notification document can be generated. The standards notification document can indicate which attributes correspond to a particular GUI standard, and which do not. For example, the objects 204, 206, 208 that are identified, and their attributes, can be compared to objects and attributes defined in a standard or protocol applicable to the view 200. The objects and attributes defined in the standard or protocol can be accessed from a suitable file, for example a text file, an XML file, a data table, a hash table, etc. Again, the attributes identified in the standards notification document can be attributes corresponding to all objects 204, 206, 208 in the view, or exclusively attributes corresponding to selected objects 204, 206, 208.

Further, the graphical analysis software can create an attribute rule set based on the objects in the view 200 and their corresponding attributes. Again, this rule set can be based on all of the objects 204, 206, 208 within the view 200, or only objects 204, 206, 208 that are selected. The attribute rule set can indicate attributes that are expected for each of the objects 204, 206, 208 based on attributes that are common the objects 204, 206, 208. In illustration, attributes that are common among a portion of the objects 204, 206, 208 can be identified within the view 200. Hereinafter, such attributes will be referred to as "reference attributes."

In one aspect of the invention, the view 200 can be output to a staging or temporary file. For instance, if a user and/or program does not have access to edit a source file, a staging document can be created. The objects 204, 206, 208 and reference attributes then can be identified by scanning the staging or temporary files. Nonetheless, the invention is not limited in this regard and the objects 204, 206, 208 and reference attributes can be identified in any suitable manner.

The portion of the objects 204, 206, 208 can be a majority of the objects, or a certain percentage of the objects (e.g., 60% of the objects, 75% of the objects, 90% of the objects, and so on). In one embodiment, the portion of the objects 204, 206, 208 can be determined using statistical analysis. The statistical analysis can include identifying the attributes associated with each of the objects 204, 206, 208, and generating a comparator list based on the identified data.

In one embodiment, an attribute rule set can be generated, and the list of attributes for each object can be compared to the attribute rule set. Objects 204, 206, 208 that have lists of attributes that do not correspond to the attribute rule set can be identified. For example, reference attributes contained in the attribute rule set that are lacking from certain objects 204, 206, 208 can be identified, and corresponding identifiers can be generated. In addition, attributes associated with objects 204, 206, 208 that are not contained in the attribute rule set can be identified, and corresponding identifiers can be generated. Also, one or more identifiers can be generated to identify the objects 204, 206, 208 for which reference attributes are lacking or which have associated attributes that are not reference attributes. As noted, the object identifiers and attribute identifiers then can be output in a manner that indicates which attributes are extra or lacking from each object.

In one aspect of the invention, when objects 204, 206, 208 are identified that have lists of attributes that do not correspond to the attribute rule set (or attributes defined in a standard or protocol), the attributes for the objects 204, 206, 208 can be automatically updated. For example, if an object 204, 206, 208 lacks an attribute that is contained in the attribute rule set, that attribute can be associated with the object 204, 206, 208. For instance, the computer program code that defines the object can be updated by associating a suitable attribute tag with the object. Similarly, if an object 204, 206, 208 has attributes that are not contained in the attribute rule set, those attributes can be disassociated with the object 204, 206, 208. For instance, the corresponding attribute tag can be removed from the computer program code. Any syntax changes that may needed to adjust for the addition or deletion of the attributes can be automatically implemented. In illustration, if the attribute rule set, or any other defined attributes, indicate that "OK" is to be presented in capital letters, but an attribute is identified in which "Ok" is presented, the identified attribute can be automatically updated to recite "OK." In that regard, the graphical analysis software can include, or otherwise communicate with, a syntax editor that is configured to automatically implement syntax changes in the computer program code.

In a further embodiment, rather than immediately implementing changes to the computer program code to add or remove attribute associations with the objects 204, 206, 208, each proposed change can be presented to a user via a suitable user interface, such as the GUI 202, in order to prompt the user to accept or reject each corresponding change, addition or removal of attributes associated with the objects 204, 206, 208 to/from the computer program code. For example, the user can be presented with a group of objects 204, 206, 208 for which attributes are to be changed, added or removed, and the user can select one or more of these objects for which the changes are accepted or rejected.

Regardless of whether the changes to the computer program code are implemented immediately or in response to a user acceptance/rejection of the changes, any such changes can be undone in response to a user request. Such user request can be entered into the graphical analysis software in any suitable manner. For example, an undo button can be presented in the GUI 202. In another arrangement, a backup copy of the original source file for the view 200 can be saved so that in lieu of relying on a method of undoing changes that have been made, the backup copy of the original source file can be restored to replace a working copy of the source file.

FIG. 3 is a flow chart illustrating a method 300 of analyzing objects from a GUI in accordance with another embodiment of the present invention. At step 302, attributes assigned to various objects assigned to a view of a GUI can be dynamically scanned in order to identify attributes associated with each of the objects. At step 304, for each of the objects, a list of attributes can be generated. In one embodiment, an attribute rule set can be generated based on the attributes associated with each of the objects.

At step 306, a determination can be made as to whether at least one of the objects has a list of attributes that does not correspond to lists of attributes for other objects. For example, the list of attributes for each object can be compared to the attribute rule set. In another arrangement, the attributes for each object can be compared to objects and attributes defined in an applicable standard or protocol.

At step 308, when at least one object has a list of attributes that does not correspond to lists of attributes for other objects (or a standard/protocol), an identifier can be output. The identifier can indicate that the object has the list of attributes that does not correspond to the lists of attributes for the other objects (or the standard/protocol).

Like numbers have been used herein to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of analyzing graphical user interface objects in a view of a graphical user interface, comprising:
    dynamically scanning each of the graphical user interface objects to identify attributes respectively associated with each of the graphical user interface objects;
    generating, for each of the graphical user interface objects, a list of attributes associated therewith;
    identifying, within the graphical user interface objects, a group of graphical user interface objects having a similar type;
    identifying, for the group, an attribute found in at least one member of the group and not found in at least one other member of the group;
    outputting an identifier indicating the attribute found in at least one member of the group and not found in at least one other member of the group;
    generating, based upon the attributes respectively associated with each of the graphical user interface objects, an attribute rule set that indicates expected attributes based upon attributes that are common among a set of the graphical user interface objects; and
    automatically updating a list of attributes for a first graphical user interface object, wherein the list of attributes includes an attribute that is not common among a set of the graphical user interface objects with which the first graphical user interface objects is associated.

2. The method of claim 1, further comprising
    automatically updating a list of attributes for a first graphical user interface object that does not include an attribute that is common among a set of the graphical user interface objects with which the first graphical user interface objects is associated.

3. The method of claim 2, wherein
    the list of attributes for the first graphical user interface object is updated to include the attribute that is common among the set of the graphical user interface objects with which the first graphical user interface objects is associated.

4. The method of claim 1, wherein
    the list of attributes for the first graphical user interface object is updated to remove the attribute that is not common among the set of the graphical user interface objects with which the first graphical user interface objects is associated.

5. A computer hardware system for analyzing graphical user interface objects in a view of a graphical user interface, comprising:
    at least one hardware processor configured to initiate the following executable operations:
        dynamically scanning each of the graphical user interface objects to identify attributes respectively associated with each of the graphical user interface objects;
        generating, for each of the graphical user interface objects, a list of attributes associated therewith;
        identifying, within the graphical user interface objects, a group of graphical user interface objects having a similar type;
        identifying, for the group, an attribute found in at least one member of the group and not found in at least one other member of the group;
        outputting an identifier indicating the attribute found in at least one member of the group and not found in at least one other member of the group;
        generating, based upon the attributes respectively associated with each of the graphical user interface objects, an attribute rule set that indicates expected attributes based upon attributes that are common among a set of the graphical user interface objects; and
        automatically updating a list of attributes for a first graphical user interface object, wherein the list of attributes includes an attribute that is not common among a set of the graphical user interface objects with which the first graphical user interface objects is associated.

6. The system of claim 5, wherein the at least one hardware processor is further configured to initiate automatically updating a list of attributes for a first graphical user interface object that does not include an attribute that is common among a set of the graphical user interface objects with which the first graphical user interface objects is associated.

7. The system of claim 6, wherein the list of attributes for the first graphical user interface object is updated to include the attribute that is common among the set of the graphical user interface objects with which the first graphical user interface objects is associated.

8. The system of claim 5, wherein the list of attributes for the first graphical user interface object is updated to remove the attribute that is not common among the set of the graphical user interface objects with which the first graphical user interface objects is associated.

9. A computer program product, comprising a computer readable storage medium having stored therein computer readable program code, the computer readable program code, which when executed by a computer hardware system, causes the computer hardware system to perform:

dynamically scanning each of the graphical user interface objects to identify attributes respectively associated with each of the graphical user interface objects;

generating, for each of the graphical user interface objects, a list of attributes associated therewith;

identifying, within the graphical user interface objects, a group of graphical user interface objects having a similar type;

identifying, for the group, an attribute found in at least one member of the group and not found in at least one other member of the group;

outputting an identifier indicating the attribute found in at least one member of the group and not found in at least one other member of the group;

generating, based upon the attributes respectively associated with each of the graphical user interface objects, an attribute rule set that indicates expected attributes based upon attributes that are common among a set of the graphical user interface objects; and automatically updating a list of attributes for a first graphical user interface object, wherein the list of attributes includes an attribute that is not common among a set of the graphical user interface objects with which the first graphical user interface objects is associated.

10. The computer program product of claim 9, wherein the computer readable program code further causes the computer hardware system to perform automatically updating a list of attributes for a first graphical user interface object that does not include an attribute that is common among a set of the graphical user interface objects with which the first graphical user interface objects is associated.

11. The computer program product of claim 10, wherein the list of attributes for the first graphical user interface object is updated to include the attribute that is common among the set of the graphical user interface objects with which the first graphical user interface objects is associated.

12. The computer program product of claim 9, wherein the list of attributes for the first graphical user interface object is updated to remove the attribute that is not common among the set of the graphical user interface objects with which the first graphical user interface objects is associated.

* * * * *